US009905318B2

(12) United States Patent
Perkins (10) Patent No.: US 9,905,318 B2
(45) Date of Patent: Feb. 27, 2018

(54) HYBRID INDIRECT-DRIVE/DIRECT-DRIVE TARGET FOR INERTIAL CONFINEMENT FUSION

(71) Applicant: Lawrence Livermore National Security, LLC, Livewrmore, CA (US)

(72) Inventor: Lindsay John Perkins, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 922 days.

(21) Appl. No.: 14/261,991

(22) Filed: Apr. 25, 2014

(65) Prior Publication Data

US 2014/0334585 A1    Nov. 13, 2014

Related U.S. Application Data

(60) Provisional application No. 61/820,503, filed on May 7, 2013.

(51) Int. Cl.
G21B 1/19    (2006.01)
G21B 1/23    (2006.01)

(52) U.S. Cl.
CPC    *G21B 1/19* (2013.01); *G21B 1/23* (2013.01)

(58) Field of Classification Search
CPC combination set(s) only.
See application file for complete search history.

(56) References Cited

U.S. PATENT DOCUMENTS

2011/0286563 A1* 11/2011 Moses ............... G21B 1/01
376/146
2013/0308736 A1* 11/2013 Kucheyev .......... G21B 1/19
376/151

OTHER PUBLICATIONS

Atzeni et al., "Beam Plasma Interaction, Hydrodynamics, Hot Dense Matter," The Physics of Inertial Fusion, Oxford University Press, NY, 2004, 1 pp.
Betti et al., "Shock Ignition of Thermonuclear Fuel with High Areal Densities", J. of Phys: Conf. Series 112, 022024, 2008, pp. 1-4.
Bodner et al., "Direct-Drive Laser Fusion: Status and Prospects", Phys. Plasmas, vol. 5, No. 5, 1998, pp. 1901-1918.

(Continued)

*Primary Examiner* — Sean P Burke
(74) *Attorney, Agent, or Firm* — Eddie E. Scott (57) ABSTRACT

A hybrid indirect-drive/direct drive for inertial confinement fusion utilizing laser beams from a first direction and laser beams from a second direction including a central fusion fuel component; a first portion of a shell surrounding said central fusion fuel component, said first portion of a shell having a first thickness; a second portion of a shell surrounding said fusion fuel component, said second portion of a shell having a second thickness that is greater than said thickness of said first portion of a shell; and a hohlraum containing at least a portion of said fusion fuel component and at least a portion of said first portion of a shell; wherein said hohlraum is in a position relative to said first laser beam and to receive said first laser beam and produce X-rays that are directed to said first portion of a shell and said fusion fuel component; and wherein said fusion fuel component and said second portion of a shell are in a position relative to said second laser beam such that said second portion of a shell and said fusion fuel component receive said second laser beam.

8 Claims, 4 Drawing Sheets

(56) References Cited

OTHER PUBLICATIONS

Igumenshchev et al., "Cross-Beam Energy Transfer in Direct-Drive Implosions", Phys. Plasmas, No. 19, 2012, pp. 056314-1-056314-12.
Lindl, "Inertial Confinement Fusion", AIP Press, Springer-Verlag, 1998, 3 pp.
Moses et al., "A Sustainable Nuclear Fuel Cycle Based on Laser Inertial Fusion Energy", Fusion Science and Technology, vol. 56, No. 2, 2009, pp. 547-565.
Murakami et al., "Innovative Ignition Scheme for ICF—Impact Fast Ignition", Inst. of Phys. Publ. and Int'l Atomic Energy Agency, Nucl. Fusion, 46, 2006, pp. 99-103.
Perkins et al., "Development of a Polar Drive Shock Ignition Platform on the National Ignition Facility", Lawrence Livermore National Laboratory, LLNL Technical Report, LLNL-TR-432811, 2010, pp. 1-8.
Perkins et al., "Shock Ignition: A New Approach to High Gain Inertial Confinement Fusion on the National Ignition Facility", Phys. Rev. Lett., 103, 2009, pp. 045004-1-045004-4.
Skupsky et al., "Polar Direct Drive on the National Ignition Facility", Phys. Plasmas, vol. 11, No. 5, 2004, pp. 2763-2770.
Tabak et al., "Ignition and High Gain with Ultrapowerful Lasers", Phys. Plasmas, vol. 1, No. 5, 1994, pp. 1626-1634.
Terry et al., "Design of a Deuterium and Tritium-Ablator Shock Ignition Target for the National Ignition Facility" Phys. Plasmas, vol. 19, 2012, pp. 112705-1-112705-13.

\* cited by examiner

HYBRID INDIRECT-DRIVE/DIRECT-DRIVE TARGET FOR INERTIAL CONFINEMENT FUSION

CROSS-REFERENCE TO RELATED APPLICATIONS

This application claims benefit under 35 U.S.C. § 119(e) of U.S. Provisional Patent Application No. 61/826,598 filed May 23, 2013 entitled "Hybrid Indirect-Drive/Direct-Drive Target for Inertial Confinement Fusion," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to relates to inertial confinement fusion, inertial fusion energy, and more particularly to a hybrid indirect-drive/direct-drive target for inertial confinement fusion.

State of Technology

In inertial confinement fusion (ICF), a driver—i.e., a laser, heavy-ion beam or a pulse power system—delivers an intense energy pulse to a target containing around a milligram of deuterium-tritium (DT) fusion fuel in the form of a hollow shell. The fuel shell is rapidly compressed to high densities and temperatures sufficient for thermonuclear fusion to commence. The goal of present ICF research is to obtain ignition and fusion energy gain from a DT target. The gain of an ICF target is defined as the ratio of the fusion energy produced to the driver energy incident on the target and is a key parameter in determining economic viability of future inertial fusion energy power plants. The two primary methods of driving ICF targets are "indirect-drive" and "direct-drive."

The National Ignition Facility (NIF) is presently seeking to demonstrate laser-driven ICF ignition and fusion energy gain in the laboratory for the first time by means of indirect-drive. In the latter, the laser energy is first converted to x-rays in a hohlraum surrounding the fuel capsule and the x-rays then perform the ablatively-driven compression of the capsule. Direct-drive is an alternative method of imploding ICF targets where the laser beams impinge directly on the capsule surface and directly cause ablation compression. In both cases, ignition is initiated by the PdV work of the high-velocity converging shell stagnating on a central hotspot. Applicant can define this ignition method as "fast compression ignition".

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a hybrid indirect-drive/direct drive apparatus for inertial confinement fusion utilizing laser beams from a first direction and laser beams from a second direction, comprising: a central fusion fuel component; a first portion of a shell surrounding said central fusion fuel component, said first portion of a shell having a first thickness; a second portion of a shell surrounding said fusion fuel component, said second portion of a shell having a second thickness that is greater than said thickness of said first portion of a shell; and a hohlraum containing at least a portion of said fusion fuel component and at least a portion of said first portion of a shell; wherein said hohlraum is in a position relative to said first laser beam and to receive said first laser beam and produce X-rays that are directed to said first portion of a shell and said fusion fuel component; and wherein said fusion fuel component and said second portion of a shell are in a position relative to said second laser beam such that said second portion of a shell and said fusion fuel component receive said second laser beam. The present invention includes the hybrid indirect-drive/direct drive apparatus for inertial confinement fusion further comprising a fill tube extending through said first portion of a shell or said second portion of a shell to said fusion fuel component.

The present invention provides a hybrid indirect-drive/direct drive method for inertial confinement fusion utilizing laser beams from a first direction and laser beams from a second direction, comprising the steps of: providing a unit of fusion fuel, assembling a first portion of a shell having a first thickness partially surrounding the fusion fuel unit, assembling a second portion of a shell having a second thickness greater than the first thickness of the first portion of a shell partially surrounding the fusion fuel unit to complete the shell, assembling a hohlraum containing at least a portion of the fusion fuel unit and at least a portion of the first portion of a shell in a position relative to the first laser beam, shock igniting the first portion of a shell and the fusion fuel using the first laser beam to produce X-rays that are directed to the first portion of a shell and the fusion fuel; and shock igniting the second portion of a shell and the fusion fuel using the second laser beam. The present invention includes a hybrid indirect-drive/direct drive method for inertial confinement fusion further comprising the step of using a fill tube extending through the shell to inject fusion fuel into the unit of fusion fuel.

The present invention provides a hybrid, high-gain target for inertial confinement fusion that combines the symmetry advantages of indirect-drive fuel assembly with the efficiency of radial-direct-drive shock ignition in a capsule with thick fuel shells. A slow, thick spherical shell segment of fusion fuel is assembled on a high-density metal guide cone (e.g. gold) by indirect radiation drive in a one-sided hohlraum. It is then shock ignited on the opposite side by radial-direct-drive on a corresponding spherical fuel segment inside the cone. The two fuel segments communicate hydrodynamic energy and momentum at late time via a hole at the cone tip. Such a target is well suited for the laser beam geometry of the National Ignition Facility because the direct-drive side is pure radial; thus it would not require a future polar-direct-drive qualification campaign or new phaseplates in the final optics and will minimize laser cross beam transfer. Its natural two-sided laser illumination geometry and high-gain prospects also make it attractive for future inertial fusion energy power plants.

The present invention has use as a high gain target for inertial fusion energy power plants. The present invention has use as an inertial confinement fusion platform for the National Ignition Facility to obtain thermonuclear ignition and fusion energy gain.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a hybrid, high-gain target for inertial confinement fusion that combines the symmetry advantages of indirect-drive fuel assembly with the efficiency of radial-direct-drive shock ignition in a capsule with thick fuel shells. A slow, thick spherical shell segment of fusion fuel is assembled on a high-density metal guide cone (e.g. gold) by indirect radiation drive in a one-sided hohlraum. It is then shock ignited on the opposite side by radial-direct-drive on a corresponding spherical fuel segment inside the cone. The two fuel segments communicate hydrodynamic energy and momentum at late time via a hole at the cone tip. Such a target is well suited for the laser beam geometry of the National Ignition Facility because the direct-drive side is pure radial; thus it would not require a future polar-direct-drive qualification campaign or new phaseplates in the final optics and will minimize laser cross beam transfer. Its natural two-sided laser illumination geometry and high-gain prospects also make it attractive for future inertial fusion energy power plants.

Figure 1A:
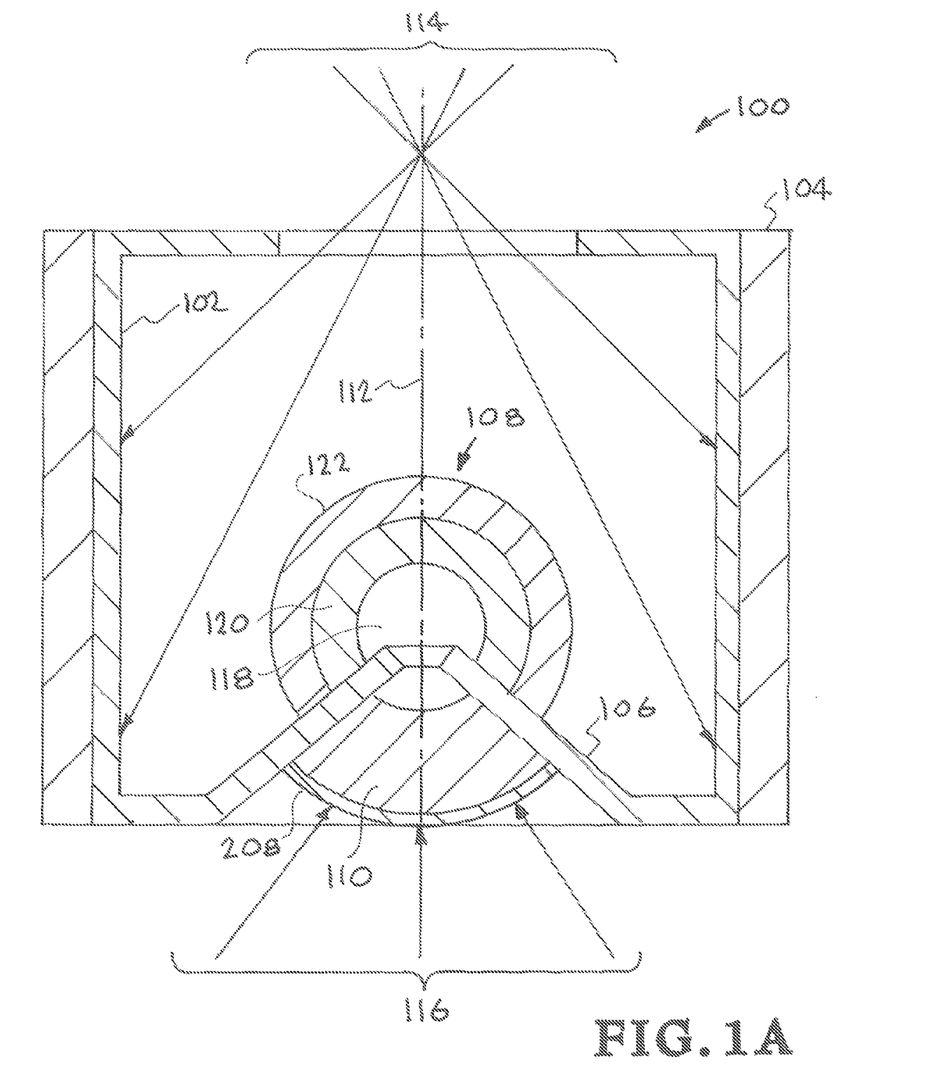
FIG. 1A illustrates an embodiment of a hybrid target.
Figure 1B:
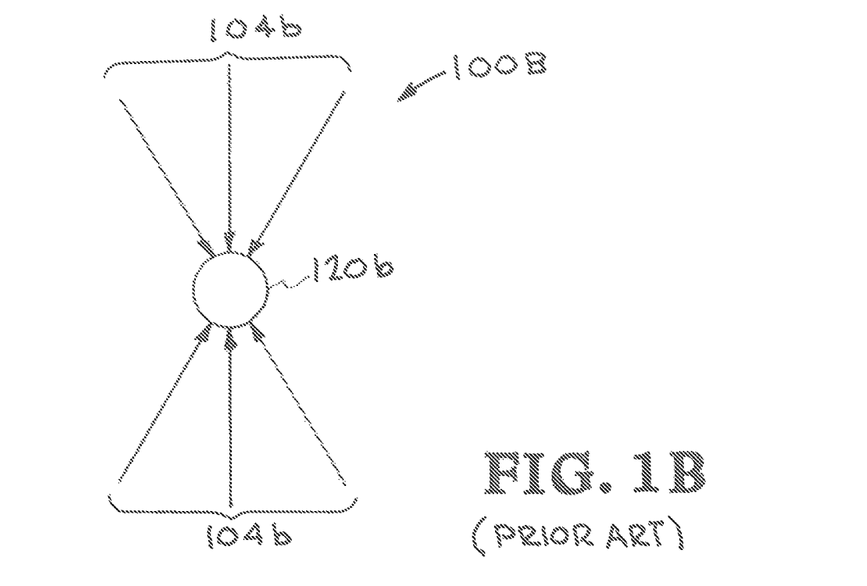
FIG. 1B illustrates a Prior Art Direct Drive target.
Figure 1C:
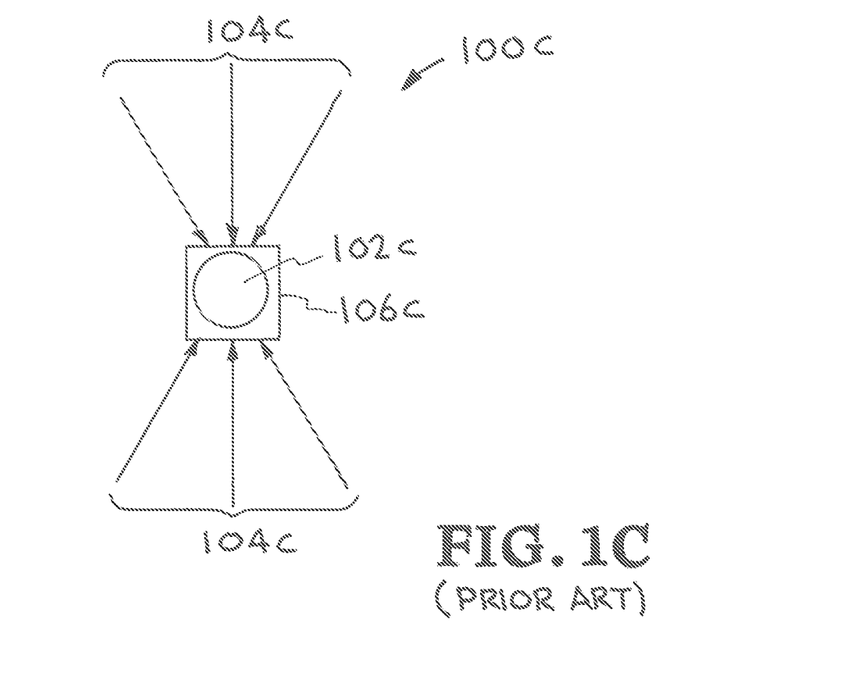
FIG. 1C illustrates a Prior Art Indirect Drive target.

Definition of "direct drive:" In the "direct drive" method energy is delivered to the outer layer of the target using high-energy beams. The heated outer layer explodes outward, producing a reaction force against the remainder of the target, accelerating it inwards, compressing the target. A Prior Art Direct Drive target 100*b* with laser beams 104*b* converging on a pellet 120*b* is illustrated in FIG. 1B.

Definition of "Indirect drive:" In the "indirect drive" method the lasers heat the inner walls of a gold cavity called a hohlraum containing the pellet, creating a superhot plasma which radiates a uniform "bath" of soft X-rays. The X-rays rapidly heat the outer surface of the fuel pellet, causing a high-speed ablation, or "blowoff," of the surface material and imploding the fuel capsule in the same way as if it had been hit with the lasers directly. Symmetrically compressing the capsule with radiation forms a central "hot spot" where fusion processes set in—the plasma ignites and the compressed fuel burns before it can disassemble. A Prior Art Indirect Drive target 100*c* with laser beams 104*b* converging on a hohlraum 106*c* and a pellet 102*c* is illustrated in FIG. 1B.

The National Ignition Facility (NIF) is presently seeking to demonstrate laser-driven ICF ignition and fusion energy gain in the laboratory for the first time by means of indirect-drive. In the latter, the laser energy is first converted to x-rays in a hohlraum surrounding the fuel capsule and the x-rays then perform the ablatively-driven compression of the capsule. Direct-drive is an alternative method of imploding ICF targets where the laser beams impinge directly on the capsule surface and directly cause ablation compression. In both cases, ignition is initiated by the PdV work of the high-velocity converging shell stagnating on a central hotspot. Applicant can define this ignition method as "fast compression ignition".

The attractive features of indirect-drive include the radiation smoothing of low-mode laser drive asymmetries by the hohlraum and strong ablative stabilization of Rayleigh-Taylor instabilities due to the deeply penetrating x-rays. It is however, inefficient due to the low conversion efficiency of laser energy to x-rays in the hohlraum. Not only does this result in only modest fusion energy gain but necessitates thin, high aspect ratio, high velocity fuel shells in order to achieve ignition; such thin shells are susceptible to breakup and mix that may impair the attainment of the ignition temperature.

By contrast, because the laser impinges directly on the fuel capsule, direct-drive is a more efficient at converting laser energy into hydrodynamic motion of the shell and higher fusion energy gains can result. However, it lacks the smoothing features of indirect radiation drive and thus the imploding shell can be more susceptible to asymmetry and stability issues. Moreover, the laser beams on NIF are configured for indirect-drive—that is, they are arranged in four hemispherical-opposed cones from 23.5 deg to 50 deg in order to thread through holes at the top and bottom ends of the hohlraum—whereas, in principle, direct-drive requires symmetric drive beams over 4€ solid angle. Tests of direct-drive on NIF are possible in "polar-direct-drive" where the beams are retained in the present up-down, indirect-drive port configurations but where sufficient drive uniformity may be achievable by a combination of beam repointing and partial defocusing. The latter fix may also incur cross-beam power transfer where incoming beams from one direction scatter power off beams refracted from other directions. Finally, while fully spherical beam illumination geometry is ideally required for direct-drive target performance, it is not an optimum geometry for an inertial fusion energy power plant because of the large number of penetrations required through the target chamber vessel for the beam ports. A two-sided-drive geometry is much preferred.

In the case of direct-drive (but not indirect-drive), in addition to the conventional ignition method of fast compression of a high velocity shell on the hotspot, a developing ignition concept called "shock ignition" is under study where compressed fusion fuel is separately ignited by a strong late time shock. Here, the fuel assembly and ignition phases are decoupled as follows: The cryogenic shell is initially imploded on a low adiabat using a laser main drive of modest peak power and lower total energy. While the resulting low implosion velocity yields only a low temperature central region, the low adiabat of the fuel leads to high values of the assembled areal and mass densities. The compressed fuel is then separately ignited from a central hotspot heated by a strong, spherically-convergent shock driven by a high intensity spike at the end of the laser pulse. The launching of the ignition shock is timed to reach the center just as the main fuel is stagnating and starting to rebound. Because the implosion velocity is significantly less than that required for conventional (fast-compression) hotspot ignition, considerably more fuel mass can be assembled for the same kinetic energy in the shell. This larger burning fuel mass then provides higher fusion gains/yields for the same laser drive energy or, equivalently, retaining acceptable gains at lower drive energies. Shock ignition can be considered a more efficient way to perform direct-drive and higher target gains result. However, being direct-drive, it still ideally requires the uniformity of full symmetric beam illumination and thus on NIF will have to depend on polar-direct-drive illumination with possibly attendant cross beam energy transfer issues.

It should be noted that that it is not feasible to achieve shock ignition in pure indirect-drive. While the drive laser would be capable of providing the required fast rise of the shock pulse, the resulting radiation drive temperature rises only slowly due to the thermal inertia of the hohlraum. Secondly, because the shock is not launched until late time where the capsule has converged to around one third of its original radius, the now large case-to-capsule ratio results in low radiation coupling efficiency. The result is that only a weak decaying shock would be launched through the shell with no contribution to the central temperature at stagnation.

An alternative and more speculative approach to inertial confinement fusion presently under study is "fast ignition" that, like shock ignition, seeks to decouple fuel assembly from the ignition process, and may circumvent some of the above issues that encumber both conventional indirect and direct-drive. However, fast ignition requires two physically distinct, time-synchronized laser systems—a main "slow" laser driver (~20-40 ns) to compress the fuel and a separate fast, ten-petawatt-class laser (~10's ps), to create a high energy (~MeV) electron beam in the target to ignite the fuel. In particular, given the very demanding timing and spatial focusing requirements, present studies suggest that fast ignition may not be viable without some breakthrough in the efficiency of the energy channeling from the fast ignitor laser beam to the ignition hotspot. Because of these issues, there are no plans to attempt fast ignition on NIF in the foreseeable future.

A variant of fast ignition known as "impact fast ignition" attempts to circumvent the difficulty of channeling the energy of the high power, short pulse laser into the high energy electron beam by instead causing the fast laser to drive a thin, high velocity (~$2\times10^8$ cm/s) flyer plate that stagnates against the compressed fuel. This approach has the critical issues of inflight breakup of the flyer plate during to instabilities and mix of the flyer plate material with the high density fuel during stagnation that can prevent the hotpot from igniting. This approach shares with the hybrid target the concept of employing a guide cone for spherical fuel segments. The major difference is that impact ignition is a fast ignition variant in that the fuel is assembled isochorically (constant density) with no low density hotspot and is then fast ignited by the impacting flyer plate. By contrast, the hybrid target employs conventional isobaric assembly such that the high density cold compressed fuel and low temperature hotspot are in pressure equilibrium during stagnation and ignition of the hotspot is produced by shock ignition. Other design and operational differences are highlighted in FIG. 3 below The present invention provides a new concept for a hybrid, high-gain ignition target for inertial confinement fusion that combines the symmetry features of indirect-drive fuel assembly with the efficiency of radial-direct-drive shock ignition in a capsule with thick fuel layers.

The present invention provides a hybrid, high-gain target for inertial confinement fusion that combines the symmetry advantages of indirect-drive fuel assembly with the efficiency of radial-direct-drive shock ignition in a capsule with thick fuel shells. A slow, thick spherical shell segment of fusion fuel is assembled on a high-density metal guide cone (e.g. gold) by indirect radiation drive in a one-sided hohlraum. It is then shock ignited on the opposite side by radial-direct-drive on a corresponding spherical fuel segment inside the cone. The two fuel segments communicate hydrodynamic energy and momentum at late time via a hole at the cone tip. Such a target is well suited for the laser beam geometry of the National Ignition Facility because the direct-drive side is pure radial; thus it would not require a future polar-direct-drive qualification campaign or new phaseplates in the final optics and will minimize laser cross beam transfer. Its natural two-sided laser illumination geometry and high-gain prospects also make it attractive for future inertial fusion energy power plants.

Conventional indirect-drive offers low mode drive symmetry and strong ablative stabilization during the capsule drive. It is, however, inefficient, requires thin, high velocity fuel shells and results in low fusion energy gains. By contrast, shock ignition in direct-drive offers higher drive efficiency in slow, thick shells but implementation ideally requires fully symmetric laser beam illumination which is not optimum for inertial fusion energy plant applications; testing of shock ignition on NIF will necessitate polar-direct-drive illumination and potentially new phaseplates in the laser final optics and may incur the penalty of cross beam energy transfer.

In this hybrid concept, Applicant exploits the advantages of both approaches in a hybrid target configuration. A design example is shown in FIG. 1A. A slow, thick ~250 deg spherical shell segment of DT fuel is assembled on a high density metal guide cone (e.g., gold) by indirect-drive in a one-sided hohlraum. The gold surface is coated with a low-atomic number anti-mix layer, e.g. C. It is then shock ignited on the opposite side via direct-drive on a ~110 deg spherical fuel segment inside the cone. Given that the target has a natural two-sided symmetry and the direct-drive side is pure radial drive over a ~110 deg fuel segment, it doesn't require a polar-direct-drive qualification campaign on NIF or new phaseplates and should eliminate cross beam for transfer between the direct-drive beams. Its two-sided illumination geometry and high-gain prospects also make it attractive for future inertial fusion energy plants.

The two fuel segments both comprise thick layers of solid cryogenic DT. On the indirect-drive side, the fuel shell segment is backed by an ablator shell segment comprising plastic (CH) or other low-atomic-number material such as Be, diamond, SiC, B4C, etc., containing a small fraction (~2-4% atomic) of higher atomic number dopant (e.g., Si) to absorb the high-frequency M-band radiation from the hohlraum. The radial composition of this shell is similar to those under consideration for the present NIF indirect-drive target for the National Ignition Campaign (hereinafter the "NIC" target), except the DT fuel layer is much thicker and the ablator is thinner (see design specifications below). The direct-drive side segment is simply a very thick layer of solid cryogenic DT that acts as both ablator and fuel; approximately half the DT ablates outwards during the drive and the other half is compressed inwards. A thin (~10-15 im) plastic CH seal coat is required on the outside of this all-DT segment but this burns off early in the laser drive. If it should prove difficult to produce smooth solid DT "ice" layers on each side of the cone using the conventional "beta-layering" technique established for the NIC target, Applicant has the option of employing liquid DT wicked into low density (~25 mg/cc) CH foam shells. This latter variant adds the possible complication of impurity mix in the DT fuel, but because the DT fuel is in liquid form it would not exhibit the surface structure ("roughness") of solid frozen DT that can form a seed source for instability growth.

The two converging fuel segments communicate energy and momentum at late time via a ~50-100 μm diameter hole at the cone tip. The hotspot on the direct-drive side is shock ignited by a spherically-converging shock driven the high intensity spike at the end of the direct-drive laser pulse with the hotspot tamped by the assembled areal density of the stagnated fuel on the indirect-drive side. The ignition energy from the direct-drive shock ignition side is transmitted to the indirect-drive side and a thermonuclear burn wave propagates into the cold compressed fuel of the latter. Given that the majority (~80%) of the DT fuel resides on the indirect-drive side, a corresponding majority of the total thermonuclear yield accrues from that side.

FIG. 1A illustrates the general layout of the indirect-dive/direct drive target for inertial confinement fusion of the present invention. The following numbered components are illustrated in FIG. 1A:

100 HYBRID INDIRECT-DRIVE/DIRECT-DRIVE TARGET ASSEMBLY
104 GOLD HOHLRAUM Al BACKUP
106 GUIDE CONE
108 INDIRECT-DRIVE FUEL SEGMENT
110 DIRECT-DRIVE FUEL SEGMENT
112 CENTER LINE
114 INDIRECT-DRIVE LASER BEAM ARRAY
116 DIRECT-DRIVE LASER BEAM ARRAY
118 GAS FILLED VOLUME D-T GAS
120 INNER LAYER SOLID DEUTERIUM-TRITIUM (D-T)
122 OUTER LAYER CH PLASTIC +2% Si

The reference number 100 indicates the target assembly that is symmetrical about the centerline 112. The main components that comprise the target assembly 100 are the gold hohlraum 102 and it's aluminum backing 104, a guide cone 106 an indirect-drive fuel segment 108 and a direct-drive fuel segment 110. The two polar laser beams arrays the indirect- beam array 114 and the direct-drive beam array 116. Some of these items will be described in greater detail in FIG. 2.

In FIG. 1A Applicant shows the design specifications for a high gain experimental test platform for this hybrid target for fielding on NIF. The DT fuel layer thicknesses on the indirect-drive is 210 μm and in this design example uses a Si-doped (2%) CH plastic ablator of thickness 120 μm; alternative ablator materials could include Be, diamond, SiC, B4C, etc. The direct-drive side comprises a 350 μm-thick segment of DT that acts as both fuel and ablator within a thin 15 μm seal coat. The two fuel layers are factors of X3 and 5× thicker than the fuel layer for the present NIC baseline design, an important consideration in determining stability and corresponding potential for shell breakup and mix.

Applicant performed two-dimensional (2D) design optimizations with the LASNEX radiation-hydrodynamics implosion code on the prospective NIF hybrid platform shown in FIG. 1A. Applicant first optimizes the implosion dynamics of the indirect-drive segment to maximize the areal density of the stagnated fuel layer by tuning the laser drive pulse shape in the hohlraum. This stagnated fuel shell then acts as a tamp mass for the ignition hotspot initiated on the other side. The indirect-drive assembly side requires a one-sided drive energy of 0.71 MJ at a peak power of 157 TW, resulting in a hohlraum peak radiation temperature of 248 eV. (This should be compared with the present NIC target that requires a two-sided drive of ~1.8 MJ at 500 TW and ~300 eV). Applicant then optimizes the foot and main drive of the laser pulse shape on the direct-drive ignition side to maximize the areal density of that stagnating shell segment, followed by tuning of the launch time of the ignition shock pulse to maximize the temperature in the ignition hotspot. The radial direct-drive shock ignition side requires a one-sided drive of ~0.53 MJ at 231 TW (This should be compared with prospective polar-direct-drive shock ignition targets for NIF that require two-sided (polar) drives of ~0.7-1 MJ at ~350-450 TW). Finally, because the radial-direct-drive is more efficient that the indirect-drive compression, synchronizing the two segments to optimize the 2D burn dynamics—that is, maximize the fusion yield and energy gain—requires that the start time of the former drive pulse must be delayed by ~8.2 ns after the start of the indirect-drive side.

Under the above burn optimization, this target achieves a 2D fusion yield of 39 MJ and thus a gain of ~32. Applicant also observed a unique burn history for this platform in that the rate of production of fusion energy as a function of time exhibits a double maxima as the smaller, faster direct-drive side ignites and the burn wave then propagates into the main fuel mass on the other side. With conventional single shell targets—indirect or direct-drive, fast compression ignition or shock ignition—only a single narrow maximum is observed in simulations.

The primary critical issues for this target that may ultimately determine ignition and fusion yield performance include (1) Stability of the two fuel segments during inflight convergence and late time stagnation (Such stability considerations attend all classes of inertial confinement fusion targets). (2) The achievement of adequate implosion symmetry in a one-sided hohlraum during the assembly phase of the indirect-drive side (Although Applicant notes that, unlike conventional indirect-drive, Applicant is not seeking high velocity nor ignition here, rather just the attainment of a reasonable stagnation areal density to tamp the hotspot formed on the other side) (3) Minimizing high-atomicnumber mix into the hotspot from the gold guide cone that separates the two fuel segments. A low-z (e.g., C) anti-mix surface coating is applied to the cone to ameliorate this. (Recent simulations of an analogous guide cone for a fast ignition target indicates that the drag on the sliding DT plasma at the Au/DT in tends to leave the Au mix behind). Future simulations and proof of principle experiments will determine the importance of these issues.

Figure 2:
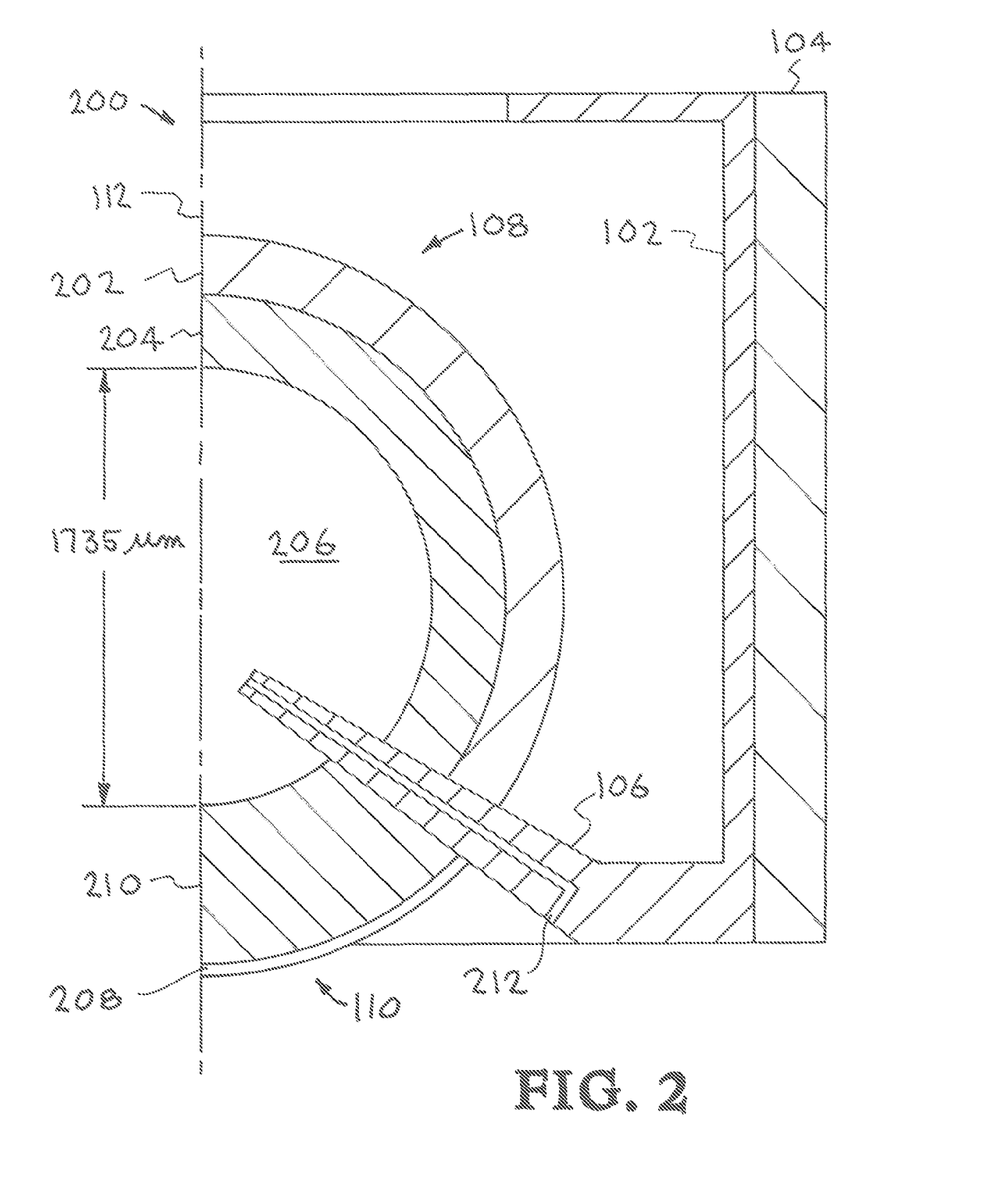
FIG. 2 provides a comparison of the features and critical issues for: (1) conventional indirect-drive, (2) polar-direct-drive shock ignition and (3) this new two-sided hybrid platform, as they relate to fielding on the National Ignition Facility.

FIG. 2 illustrates a fill tube used with the indirect-dive/direct drive target for inertial confinement fusion of the present invention. The following numbered components are illustrated in FIG. 2:

200 Half section of target assembly 100
102 Gold hohlraum 20 um thick
104 Hohlraum aluminum backing
108 Indirect-drive fuel segment
202 Outer layer CH plastic +2% Si
204 Inner layer solid deuterium-tritium (D-T) 50:50 atomic fraction 210 um thick
206 Gas filled volume D-T gas 0.0003 glcm3
208 Outer layer CH plastic (no Si) 15 um thick
210 inner layer solid deuterium-tritium (D-T) 50:50 atomic fraction 350 um thick
106 Gold support cone
212 Fill tube FIG. 2 is a half section 200 of the target assembly 100. The indirect-drive fuel segment 108 is made up of two layers, an outer layer 202 of CH plastic +2% Si and an inner layer 204 of solid Deuterium-tritium (D-T) 50:50 atomic fraction 204 um thick. The direct-drive fuel segment 110 has two layers, the outer layer 208 is CH plastic (no Si) and the inner layer 210 is solid Deuterium-tritium (D-T) 50:50 atomic fraction and is 350 um thick. The hollow volume 206 of the two fuel segments 108 and 110 is filled with D-T gas 0.003 glcm3. As shown the two fuel segments 108 and 110 are mounted on the cone section 106 of the hohlraum.

Figure 3:
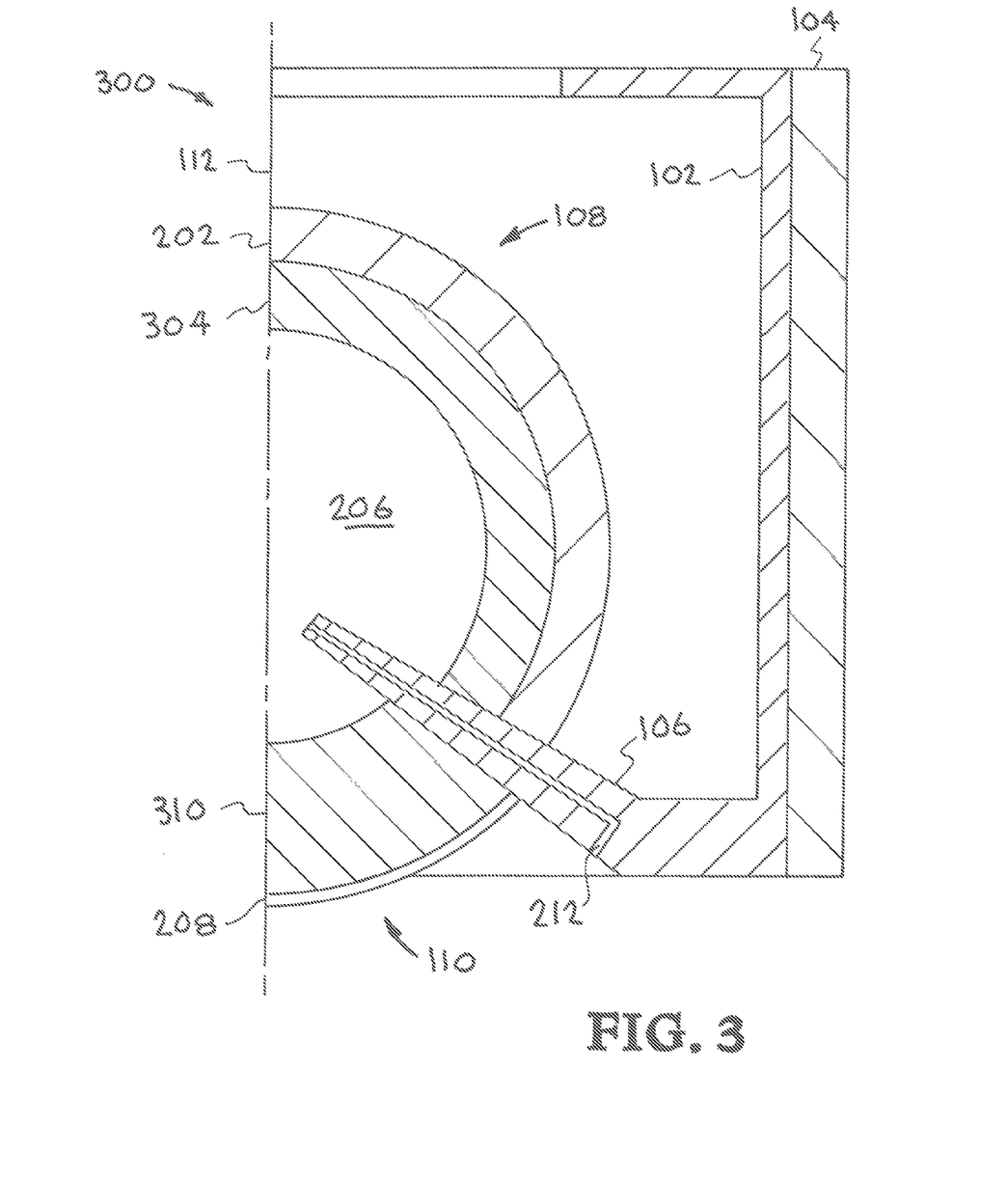
FIG. 3 delineates the main differences in the configuration and operation of the hybrid target relative to impact fast ignition.

FIG. 3 illustrates an indirect-drive/direct drive target assembly with alternate fuel layers. The following numbered components are illustrated in FIG. 3:

300 Hybrid indirect-drive/direct drive target assembly with alternate fuel layers
102 Gold hohlraum
104 Gold hohlraum aluminum backup
106 Guide cone
108 Indirect-drive fuel segment
110 direct-drive fuel segment
112 Center line
202 Outer layer CH plastic +2% Si
304 Inner layer low density (0.025 glcm3) CH foam (aerogel) filled with liquid D-T
206 Inner gas volume
208 Outer layer CH plastic (no Si)
310 Inner layer low density (0.025 glcm3) foam (aerogel) filled with liquid D-T Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in sonic cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A hybrid indirect-drive/direct drive apparatus for inertial confinement fusion, comprising:
    a central fusion fuel component;
    a first portion of a shell surrounding said central fusion fuel component, said first portion of a shell having a first thickness;
    a second portion of a shell surrounding said fusion fuel component, said second portion of a shell having a second thickness that is greater than said thickness of said first portion of a shell; and
    a hohlraum containing at least a portion of said fusion fuel component and at least a portion of said first portion of a shell,
    said hohlraum adapted to produce X-rays that are directed to said first portion of a shell and said fusion fuel component; and
    wherein said at least a portion of said fusion fuel component and said second portion of a shell are not contained in said hohlraum.

2. The hybrid indirect-drive/direct drive apparatus for inertial confinement fusion of claim 1 further comprising a fill tube extending through said first portion of a shell and said second portion of a shell to said fusion fuel component.

3. A hybrid indirect-drive/direct drive apparatus for inertial confinement fusion, comprising:
   a central fuel unit;
   a first portion of a shell surrounding said central fuel unit, said first portion of a shell having a first thickness;
   a second portion of a shell surrounding said central fuel unit, said second portion of a shell having a second thickness that is greater than said thickness of said first portion of a shell; and
   a hohlraum containing at least a portion of said central fuel unit and at least a portion of said first portion of a shell,
   said hohlraum adapted to produce X-rays that are directed to said first portion of a shell; and
   wherein said at least a portion of said central fuel unit and said second portion of a shell are not contained in said hohlraum.

4. The hybrid indirect-drive/direct drive apparatus for inertial confinement fusion of claim 3 further comprising a fill tube extending through said first portion of a shell and said second portion of a shell to said central fuel unit.

5. A hybrid indirect-drive/direct drive apparatus for inertial confinement fusion, comprising:
   a central fuel unit;
   a shell surrounding said central fuel unit, said shell having a first portion partially surrounding said central fuel unit and a second portion partially surrounding said central fuel unit;
   wherein said first portion has a first thickness and said second portion has a second thickness that is greater than said first shell thickness; and
   a hohlraum containing at least a portion of said first portion of said shell having a first thickness,
   said hohlraum adapted to produce X-rays that are directed to said first portion of said shell having a first thickness; and
   wherein said at least a portion of said central fuel unit and said second portion of said shell having a second thickness that is greater than said first shell thickness are not contained in said hohlraum.

6. The apparatus for inertial confinement fusion utilizing laser beams from a first direction and laser beams from a second direction of claim 5 further comprising a fill tube extending through said shell to said central fuel unit.

7. A hybrid indirect-drive/direct drive apparatus for inertial confinement fusion, comprising:
   a central fuel unit;
   a first portion of a shell surrounding said central fuel unit, said first portion of a shell having a first thickness;
   a second portion of a shell surrounding said central fuel unit, said second portion of a shell having a second thickness that is greater than said thickness of said first portion of a shell, said second portion of a shell comprising fuel; and
   a gold hohlraum containing at least a portion of said central fuel unit and at least a portion of said first portion of a shell,
   said gold hohlraum adapted to produce X-rays that are directed to said first portion of a shell; and
   wherein said at least a portion of said central fuel unit and said second portion of a shell are not contained in said gold hohlraum.

8. The hybrid indirect-drive/direct drive method for inertial confinement fusion of claim 7 wherein said second portion of a shell comprising fuel is solid deuterium-tritium.

* * * * *